United States Patent [19]
Suzuki et al.

[11] Patent Number: 5,194,328
[45] Date of Patent: Mar. 16, 1993

[54] PROCESS FOR THE ELECTROSTATIC COATING OF COMPOSITION AND COATED PLASTIC MOLDING

[75] Inventors: Yoshiharu Suzuki; Tomoyuki Aketa; Koishi Satoh, all os Shizuoka, Japan

[73] Assignee: Polyplastics Co., Ltd., Osaka, Japan

[21] Appl. No.: 774,145

[22] Filed: Oct. 15, 1991

Related U.S. Application Data

[63] Continuation of Ser. No. 380,462, Jul. 17, 1989, abandoned.

[30] Foreign Application Priority Data

Aug. 3, 1988 [JP] Japan ................................ 63-194234

[51] Int. Cl.$^5$ ........................ B32B 5/16; B32B 27/08; B32B 27/40; B05D 1/04
[52] U.S. Cl. ............................... 428/328; 427/393.5; 427/412.1; 427/412.5; 428/323; 428/423.1; 428/423.7; 428/425.3; 427/485
[58] Field of Search ................. 427/27, 32, 33, 412.1, 427/412.3, 412.4, 412.5, 393.5; 428/323, 328, 408, 423.1, 423.7, 425.3

[56] References Cited

U.S. PATENT DOCUMENTS 3,644,132  2/1972  Gelin ..................................... 117/5.1
4,780,340  10/1988  Takahashi et al. ............... 427/393.5
4,816,331  3/1989  Rau et al. ............................ 427/32 X
4,971,727  11/1990  Takahashi et al. .................. 252/511
5,096,761  3/1992  Roberts et al. ...................... 427/14.1

FOREIGN PATENT DOCUMENTS 0260638  3/1988  European Pat. Off. .
3322016  12/1984  Fed. Rep. of Germany ........ 427/27
55-34145  3/1980  Japan .

OTHER PUBLICATIONS

Pitt, V. et al., "The New Penguin Dictionary of Electronics", New York, New York, Viking Peuguin Inc., 1985, pp. 446 and 497.
operator's Manual for Hiroki Tester (undated).
ASTM Standard D 257-278 (Reapproved 1984).

*Primary Examiner*—Evan Lawrence
*Attorney, Agent, or Firm*—Nixon & Vanderhye

[57] ABSTRACT

An article of a crystalline thermoplastic resin is electrostatically coated by the steps of: electrostatically applying a polyurethane, olefin, polyester or epoxy primer to a molding of a resin composition comprising 100 parts by weight of a crystalline thermoplastic resin and 2 to 100 parts by weight of a conductive filler and having a surface resistivity of $10^9 \Omega$ or below, curing the primer, electrostatically applying a top coat to the resulting molding and curing the top coat by baking. The coated article is also disclosed.

4 Claims, 1 Drawing Sheet

PROCESS FOR THE ELECTROSTATIC COATING OF COMPOSITION AND COATED PLASTIC MOLDING

This is a continuation of application Ser. No. 07/380,462, filed Jul. 17, 1989, now abandoned.

The present invention relates to an improved process for electrostatic coating by which a coating film excellent in adhesion can be efficiently formed on a molding of a crystalline thermoplastic resin composition and a plastic molding coated by the same process.

PRIOR ART

Up to this time, the coating of a crystalline thermoplastic resin has been generally carried out by air spraying. However, this method has unavoidable problems in that the efficiency of adhesion is low, i.e., about 20 to 50%, that the processing cost is high and that the coating atmosphere is worsened. Therefore, electrostatic coating has recently been noted as a coating method exhibiting a high efficiency of adhesion. However, electrostatic coating is a method which has been employed in the coating of a conductive metal, so that it cannot be employed as such in the coating of a molding of a resin which is one of electric insulators. Therefore, it has been attempted to apply a conductive material comprising a cationic surfactant as a main component to the surface of a plastic to be electrostatically coated to thereby impart electrical conduction properties of a surface resistivity of $10^3$ to $10^9\Omega$ to the plastic.

This method has problems in that the plastic coated with such a conductive material tends to take water therein owing to the presence of a hydrophilic solvent in the conductive material, so that pinhole or blister tends to be generated during the drying of the top coat applied thereon and that the adhesion of a top coat is adversely affected, when the method is applied to a crystalline thermoplastic resin, although the method can be favorably applied to a noncrystalline thermoplastic resin, because a coating material relatively well adheres to such a resin. Further, it has also been attempted to apply a conductive primer containing a conductive filler instead of a conductive material.

However, this method of using a conductive primer is now problematic in that the primer itself must be applied by an inefficient coating method such as air spraying, that the method itself is difficult to automate the steps and is also remarkably uneconomical in other several respects and that the adhesion of a coating film is not always satisfactory.

DISCLOSURE OF THE INVENTION

The inventors of the present invention have studied for the purpose of finding a process for electrostatically coating a crystalline thermoplastic resin with a high efficiency of adhesion and have found that a coating film excellent in adhesion can be formed on a molding of a crystalline thermoplastic resin by electrostatic coating with a high efficiency of adhesion by preliminarily applying a specific primer to a molding of a crystalline thermoplastic resin having a surface resistivity adjusted to $10^9\Omega$ or below by the addition of a conductive filler.

Namely, the present invention relates to a process for the electrostatic coating of a crystalline thermoplastic resin which comprises electrostatically applying a polyurethane, olefin, polyester or epoxy primer to a molding of a resin composition comprising 100 parts by weight of a crystalline thermoplastic resin and 2 to 100 parts by weight of a conductive filler and having a surface resistivity of $10^9\Omega$ or below, curing the primer, electrostatically applying a top coat to the resulting molding and curing the top coat by baking, and a plastic molding coated by the process.

Examples of the crystalline thermoplastic resin to be used in the present invention include polyethylene, polypropylene, polyacetal, polyester (such as polyethylene terephthalate, polybutylene terephthalate or wholly aromatic polyester), polyphenylene sulfide, polyamide, fluororesin and polymethylpentene-1. Two or more of these resins may be simultaneously used. Further, a noncrystalline thermoplastic resin (such as ABS, acrylic resin, polycarbonate or phenoxy resin) may be simultaneously used in a small amount as an auxiliary component. Particularly, the use of polyacetal, polyester or polyphenylene sulfide resin is preferred.

The conductive filler to be used in the present invention may be fibrous, flaky or particulate and examples thereof will now be described.

Examples of the fibrous filler include carbon fibers (such as those derived from PAN and pitch), metallic fibers (such as mild steel, stainless steel, copper and its alloys, brass, aluminum and its alloys and lead), metallized glass fibers (such as glass fiber coated with nickel, copper, aluminum or silver) and nickel-coated carbon fibers.

Examples of the flaky and particulate fillers include powders and flakes of various metals such as iron, copper, aluminum, silver, gold, nickel, zinc, brass, lead and stainless steel; various carbon powders such as ketjen black, acetylene black, SRF carbon, graphite and activated carbon; carbon microballoon and glass flakes coated with metal such as nickel, silver or copper.

It is preferable to use a particulate or flaky filler having a particle diameter of 150 $\mu$m or below and/or a fibrous filler having a fiber diameter of 150 $\mu$m or below. Further, it is still preferable to use one or more members selected from among Ketjen black, acetylene black, carbon fiber and fibers, powders and flakes of stainless steel and aluminum which have each a particle or fiber diameter of 100 $\mu$m or below.

The amount of the conductive filler to be added per 100 parts by weight of the crystalline thermoplastic resin used is 2 to 100 parts by weight, preferably 5 to 60 parts by weight. If the amount is less than 2 parts by weight, the surface specific resistance of the resulting molding will exceed $10^9\Omega$ to give a lowered efficiency of adhesion in the electrostatic deposition of a top coat. On the contrary, if the amount exceeds 100 parts by weight, the preparation of the resin composition will be difficult and the mechanical strengths such as tensile strength and tensile elongation will be unfavorably lowered.

The resin composition comprising a crystalline thermoplastic resin and a conductive filler may further contain conventional additives which are ordinarily added to a thermoplastic or thermosetting resin depending upon its object, as far as its coatability such as adhesion of a coating film is not affected adversely. Examples of the additives include stabilizers such as antioxidant and ultraviolet absorber, antistatic agent, flame retardant, colorants such as dye and pigment, lubricant, crystallization accelerator and nucleating agent. Further, an organic or inorganic, fibrous, particulate or flaky reinforcing filler other than those used as the conductive filler may be suitably added to the composition depending upon the performance required to improve the mechanical properties.

The conductive filler-containing resin composition to be used in the present invention may be prepared by an ordinary process for preparing a synthetic resin composition with ordinary equipment therefor. Namely, necessary components are mixed, kneaded and pelletized with a single- or twin-screw extruder and the obtained pellet is molded into an objective article. Alternatively, the preparation of the composition may be carried out simultaneously with the molding thereof in a molding machine. Further, for the purpose of facilitating the dispersion of each component, a part or the whole of the resin component may be pulverized and mixed with the other components, followed by the pelletizing of the mixture by melt extrusion.

The above stabilizer or other additives may be added in an arbitrary step. Of course, they may be added to the other components or mixed with them just before the molding of the composition into an objective article.

The molding to be used in the present invention may be prepared by extrusion, injection, compression molding, vacuum forming, blow molding or expansion molding.

The present invention is characterized by electrostatically coating a molding of a crystalline thermoplastic resin composition having a surface resistivity adjusted to $10^9 \Omega$ or below with a primer and a top coat successively.

The primer to be used in the present invention include olefin, polyester, polyurethane and epoxy primers, among which polyurethane primers are preferred. It is still preferable that the polyurethane primer comprise ① a polyurethane resin as a major component and ② a spiro ortho ester or ③ a spiro orthocarbonate.

Examples of the above components ①, ② and ③ will now be described.

① The polyurethane resin may be either thermoplastic or thermosetting. Although the polyurethane resin includes modified polyurethane resins as far as they comprise a polyurethane resin as a main component, a thermoplastic polyurethane resin having an average molecular weight ($\overline{Mn}$) of about 2000 to 10000 is preferred because it imparts high tackiness and high elasticity to a coating film.

② Representative examples of the sprio ortho ester include 2, 2-bis [4-(2,3-epoxypropoxy)phenyl] propane / 6-hexanolide polyadduct and 8, 10, 19, 20-tetraoxatrispiro [5,2,2,5,2,2] heneicosane-2,14-diene. Among them, it is preferable to use a spiro ortho ester compound having a degree of spiro ortho esterification of about 250 to 500 g/eq, still preferably about 300 to 400 g/eq and an epoxy equivalent of 0 to 5.0 g/eq.

③ Representative examples of the spiro orthocarbonate include compounds represented by the following formulas:

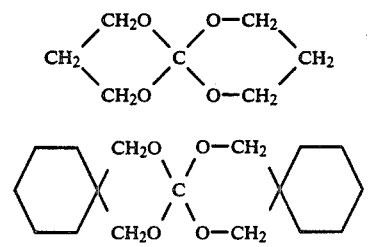

-continued

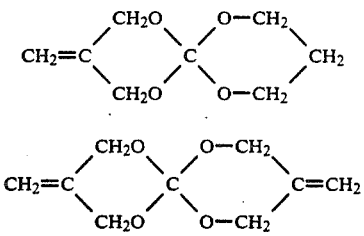

The components ② and ③ cause intramolecular irreversible ring opening in the presence of a cationic catalyst to form a crosslinked structure accompanied by expansion. Therefor, they serve to reduce the shrinkage of a coating film in the formation thereof and it can exhibit an excellent plasticizing effect even in a state of closed ring.

It is still preferable that the polyurethane primer comprise 50 to 98% by weight of ① a polyurethane resin and 50 to 2% by weight of ② a spiro ortho ester or ③ a spiro orthocarbonate.

Even when a primer containing a major component other than polyurethane is used, it is preferable to use the component ② or ③ together with it.

Further, for the purpose of improving the film-forming properties (melt flow), hardness and adhesion, the polyurethane primer may contain one or more members selected from among cellulose derivatives (for example, cellulose esters such as cellulose acetate butyrate or cellulose acetate propionate) and hydroxylated surfactants (for example, hydroxylated fluorochemical surfactant and hydroxylated silicone surfactants) in addition to the above components ① to ③. If necessary, it may further contain other various additives such as pigment or filler. Furthermore, a pigment may be added to the primer in a state diluted with a solvent.

The primers suitable for the use according to the present invention are disclosed in, for example, Japanese Patent Application No. 191331/1987.

The primer may be applied by a conventional electrostatic coater. The coater is equipped with a device for atomizing a coating liquid and discharge electrodes at a tip of an electrical insulator and may be either stationary, portable or automatic. The atomizing mechanism may be either electrical or airless, while the discharge electrodes may be either fixed or rotary. In carrying out the present invention, they may be suitably combined.

The higher the voltage of the electrostatic field during electrostatic coating, the higher the attractive force between the anode and the cathode and the higher the efficiency of adhesion. Generally, the voltage is 60 to 100 kV.

Namely, the electrostatic coating according to the present invention can be favorably carried out by a conventional method for metal or the like, so that neither the use of specific equipment nor the employment of a specific process is necessary.

The primer-coated molding is dried and cured under the conditions of time and temperature selected depending upon the resin composition and primer used. The dry film thickness is 15 to 50 μm from the standpoint of the adhesion of a top coat and the application thereof. According to the present invention, a top coat is further applied by electrostatic coating to the primer-coated molding and cured by baking at 60° to 160° C.

The top coat to be used in the present invention includes conventional coating materials essentially comprising phthalate resin, melamine resin, epoxy melamine resin, acrylic resin, urethane, unsaturated polyester resin or silicone resin. Some of these coating materials are not electrostatically charged, even when charge is applied to them in electrostatic coating. In such a case, it is effective to use a coating material in a state dissolved in an organic solvent such as alcohol or ester.

The present invention is characterized in that a conductive filler is added to a crystalline thermoplastic resin to thereby obtain a molding having a surface resistivity of $10^9 \Omega$ or below and that a specific primer is electrostatically applied to the molding prior to the electrostatic deposition of a top coat to thereby keep the adhesion of the top coat on a high level for a long period. Thus, according to the present invention, a molding of a crystalline thermoplastic resin, which is poor in coatability, can be satisfactorily coated by electrostatic deposition to form a coating film excellent in adhesion thereon. That is, a coated molding of a crystalline thermoplastic resin excellent in adhesion can be economically obtained according to the present invention.

The process for electrostatic coating according to the present invention and the molding of a crystalline thermoplastic resin coated by the process have the following advantages:

(1) the efficiency of adhesion is extremely high to give an economic advantage,
(2) a coating film excellent in adhesion can be formed on a crystalline thermoplastic resin, though it is difficult according to the prior art to form a coating film excellent in adhesion thereon,
(3) a molding can be favorably coated, even when it has any arbitrary shape such as complicated one or highly irregular one,
(4) no specific pretreatment such as plasma treatment or chemical etching is necessitated to result in a remarkably lowered cost,
(5) the efficiency of adhesion is high, i.e., 70 to 80% so that a solvent hardly diffuses to improve the coating atmosphere extremely, and
(6) the integral coating with a molded metal article is possible.

The process for electrostatic coating according to the present invention can be suitably applied to automobile exterior trim parts such as outer door handle, wheel cap, door mirror stay, fuel lid, front fender or spoiler; casing for electromagnetic shielding; decorative cases for electrical appliances and furniture parts requiring strength and heat resistance.

EXAMPLES

Figure 1:
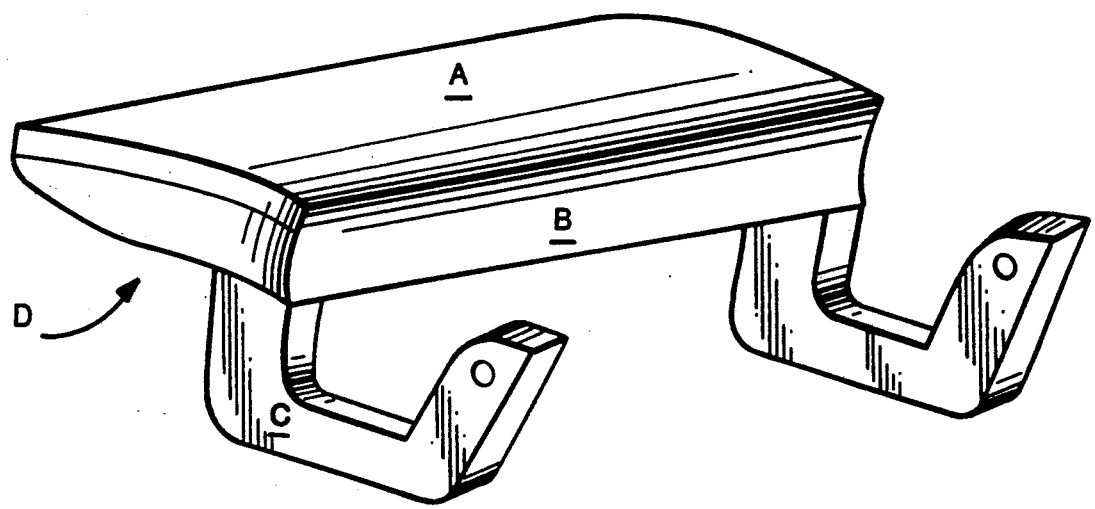
FIG. 1 is a perspective view of the automobile outer door handle prepared in the Example.

The present invention will now be described by referring to the following Examples, though it is not limited to them.

The determination of surface specific resistance and the evaluation of coating were conducted as follows:

1) Surface resistivity

A molding was degreased with isopropyl alcohol and examined for surface specific resistance with a tester (HIOKI 3116 DIGITAL MΩ Hi Tester).

2) Appearance of coating

① Throwing power of coating material

In the electrostatic coating of an outer door handle of an automobile shown in FIG. 1, the throwing power of a coating material was evaluated according to the following five criteria:
0 only the area A is covered and no other areas are coated,
1 the areas A and B are coated,
2 the areas A and B and the side part of the area C are coated,
3 the areas A, B and C are completely coated and the area D is partially coated, and
4 the face and back of a handle is completely coated.

② Gloss of coated surface

The area A of a door handle shown in FIG. 1 was coated and irradiated with a fluorescent tube (40 Watt) to evaluate the image of the fluorescent tube reflected in the area A according to the following five criteria:
0 no image of the fluorescent tube is reflected,
1 the image of the fluorescent tube is indistinct,
2 the image of the fluorescent waves,
3 the outline of the image is slightly fuzzy, and
4 a distinct image of the fluorescent tube is reflected.

3) Performance of coating film
① Initial adhesion

A coated article was allowed to stand at a room temperature for 24 hours. The surface of the coated article was linearly cut with a cutter knife at intervals of 1 mm to form eleven cut lines in each of longitudinal and crosswise directions. Thus, one hundred squares having a side of 1 mm were formed on the surface. Cellotape (a product of Nichiban Co., Ltd. specified in JIS, width : 18 mm) was applied to the resulting surface, pressed with hands and peeled to determine the number of the squares still covered with coating.

② Adhesion after water resistance test

A coated article was immersed in hot water (distilled water) kept at 40° C. for 240 hours, taken out thereof and allowed to stand at a room temperature for 24 hours. Then, the resulting article was examined for adhesion in a similar manner to the one used in the above determination of initial adhesion.

EXAMPLES 1 TO 23 AND COMPARATIVE EXAMPLES 1 TO 23

A crystalline thermoplastic resin and a conductive filler given in Table 1 were blended, melt-kneaded and pelletized with a twin-screw extruder at a temperature exceeding the melting point of the resin. The obtained pellet was injection-molded with an injection machine (mfd. by The Japan Steel Works, Ltd. J75SA) to obtain a model of an outer door handle for an automobile shown in FIG. 1 (projected area : 120 mm × 30 mm).

The door handle was degreased with isopropyl alcohol and electrostatically coated with a primer given in Table 1 with an automatic electrostatic spray coater (Auto REA gun mfd. by Ransburg-Gema) with a voltage of 60 kV and a spray air pressure of 1.5 kg/cm² The primer was set for 15 minutes and dried and cured at 80° C. for 30 minutes. A top coat was applied to the resulting handle under the same conditions as those described above, set for 10 minutes and cured by baking under the conditions given in Table 1.

After the formation of a top coat, the coated article was evaluated. For comparison, a product obtained by electrostatically coating a molding containing no conductive filler and a product obtained by electrostatically applying a top coat to a molding not coated with a primer were also evaluated. The results are shown in Table 1.

TABLE 1

| | Crystalline[1] thermoplastic resin (parts by weight) | | Conductive[2] filler (parts by weight) | | Electrostatic coating primer[3] | top coat[4] (curing condition: temp. time) | | Surface Resistivity (Ω) | Appearance throwing power | gloss | Performance of coating film initial adhesion | adhesion after water resistance test |
|---|---|---|---|---|---|---|---|---|---|---|---|---|
| Example No. | | | | | | | | | | | | |
| 1 | A-1 | (95) | B-1 | (5) | C-2 | D-1 | (140° C., 30 min.) | $1.6 \times 10^3$ | 4 | 4 | 100/100 | 100/100 |
| 2 | " | (90) | " | (10) | " | " | (") | $5.3 \times 10^8$ | 4 | 4 | " | " |
| 3 | " | (90) | B-2 | (10) | " | " | (") | $7.8 \times 10^7$ | 3 | 4 | " | " |
| 4 | " | (85) | B-3 | (15) | " | " | (") | $6.5 \times 10^8$ | 3 | 3 | " | " |
| 5 | " | (90) | B-4 | (10) | " | " | (") | $4.2 \times 10^6$ | 4 | 3 | " | " |
| 6 | " | (90) | B-1, B-4 | (5, 5) | " | " | (") | $2.3 \times 10^2$ | 4 | 4 | " | " |
| 7 | A-2 | (95) | B-1 | (5) | C-1 | " | (") | $2.1 \times 10^3$ | 4 | 4 | " | " |
| 8 | " | (95) | " | (5) | " | D-3 | (") | " | 4 | 4 | " | " |
| 9 | " | (95) | " | (5) | " | D-4 | (80° C., 30 min.) | " | 4 | 4 | " | " |
| 10 | " | (95) | " | (5) | " | D-5 | (") | " | 4 | 4 | " | " |
| 11 | " | (95) | " | (5) | C-2 | D-1 | (140° C., 30 min.) | " | 4 | 4 | " | " |
| 12 | " | (95) | " | (5) | " | D-2 | (") | " | 4 | 4 | " | " |
| 13 | " | (95) | " | (5) | " | D-3 | (") | " | 4 | 4 | " | " |
| 14 | " | (95) | " | (5) | C-3 | D-1 | (140° C., 30 min.) | " | 4 | 4 | " | " |
| 15 | " | (95) | " | (5) | C-4 | " | (") | " | 4 | 4 | " | " |
| 16 | " | (90) | B-4 | (10) | C-2 | " | (") | $5.1 \times 10^8$ | 3 | 3 | " | " |
| 17 | " | (80) | B-5 | (20) | " | " | (") | $4.9 \times 10^7$ | 3 | 3 | " | " |
| 18 | A-3 | (95) | B-1 | (5) | " | " | (") | $5.7 \times 10^3$ | 4 | 4 | " | " |
| 19 | " | (90) | B-4 | (10) | " | " | (") | $6.3 \times 10^6$ | 3 | 3 | " | " |
| 20 | " | (80) | B-5 | (20) | " | " | (") | $5.2 \times 10^7$ | 3 | 3 | " | " |
| 21 | A-4 | (95) | B-1 | (5) | " | " | (") | $2.6 \times 10^3$ | 4 | 4 | " | " |
| 22 | " | (90) | B-4 | (10) | " | " | (") | $4.7 \times 10^6$ | 3 | 4 | " | " |
| 23 | " | (80) | B-5 | (20) | " | " | (") | $3.5 \times 10^7$ | 3 | 4 | " | " |
| Comp. Example No. | | | | | | | | | | | | |
| 1 | A-1 | (100) | — | | C-2 | D-1 | (140° C., 30 min.) | $1.1 \times 10^{16}$ | 0 | 1 | 100/100 | 100/100 |
| 2 | " | (90) | B-1 | (10) | — | " | (") | $5.3 \times 10^0$ | 4 | 4 | 0/100 | 0/100 |
| 3 | " | (90) | B-2 | (10) | — | " | (") | $7.8 \times 10^7$ | 3 | 4 | 0/100 | 0/100 |
| 4 | " | (85) | B-3 | (15) | — | " | (") | $6.5 \times 10^8$ | 3 | 3 | 0/100 | 0/100 |
| 5 | " | (90) | B-4 | (10) | — | " | (") | $4.2 \times 10^6$ | 4 | 3 | 0/100 | 0/100 |
| 6 | " | (90) | B-1, B-4 | (5, 5) | — | " | (") | $2.3 \times 10^2$ | 4 | 4 | 0/100 | 0/100 |
| 7 | A-2 | (100) | — | | C-1 | " | (") | $5.0 \times 10^{16}$ | 0 | 1 | 100/100 | 100/100 |
| 8 | " | (100) | — | | " | D-3 | (") | " | 0 | 1 | 100/100 | 100/100 |
| 9 | " | (100) | — | | " | D-4 | (80° C., 30 min.) | " | 0 | 1 | 100/100 | 100/100 |
| 10 | " | (100) | — | | " | D-5 | (") | " | 0 | 1 | 100/100 | 100/100 |
| 11 | " | (95) | B-1 | (5) | — | D-1 | (140° C., 30 min.) | $2.1 \times 10^3$ | 4 | 4 | 0/100 | - 0/100 |
| 12 | " | (100) | — | | C-2 | " | (") | $5.0 \times 10^{16}$ | 0 | 1 | 100/100 | 100/100 |
| 13 | " | (100) | — | | " | D-2 | (") | " | 0 | 1 | 100/100 | 100/100 |
| 14 | " | (100) | — | | C-3 | D-1 | (") | " | 0 | 1 | 100/100 | 100/100 |
| 15 | " | (100) | — | | C-4 | " | (") | " | 0 | 1 | 100/100 | 100/100 |
| 16 | A-3 | (100) | — | | C-2 | " | (") | $6.0 \times 10^{16}$ | 0 | 1 | 100/100 | 100/100 |
| 17 | " | (95) | B-1 | (5) | — | " | (") | $5.7 \times 10^3$ | 4 | 4 | 5/100 | 0/100 |
| 18 | " | (90) | B-4 | (10) | — | " | (") | $6.3 \times 10^6$ | 3 | 3 | 3/100 | 0/100 |
| 19 | " | (80) | B-5 | (20) | — | " | (") | $5.2 \times 10^7$ | 3 | 3 | 2/100 | 0/100 |
| 20 | A-4 | (100) | — | | C-2 | " | (") | $8.0 \times 10^{16}$ | 0 | 1 | 100/100 | 100/100 |
| 21 | " | (95) | B-1 | (5) | — | " | (") | $2.6 \times 10^3$ | 4 | 4 | 12/100 | 0/100 |
| 22 | " | (90) | B-4 | (10) | — | " | (") | $4.7 \times 10^6$ | 3 | 3 | 10/100 | 0/100 |

TABLE 1-continued

| | Crystalline[1] thermoplastic resin (parts by weight) | | Conductive[2] filler (parts by weight) | | Electrostatic coating | | | Surface Resistivity ($\Omega$) | Appearance | | Performance of coating film | |
|---|---|---|---|---|---|---|---|---|---|---|---|---|
| | | | | | primer[3] | top coat[4] | (curing condition: temp. time) | | throwing power | gloss | initial adhesion | adhesion after water resistance test |
| 23 | " | (80) | B-5 | (20) | — | " | (") | $3.5 \times 10^7$ | 3 | 3 | 8/100 | 0/100 |

Note[1]
A-1: polyacetal resin (mfd. by Polyplastics Co., Ltd. trade name: "Duracon")
A-2: polybutylene terephthalate resin (mfd. by Polyplastics Co., Ltd., trade name: "Duranex")
A-3: liquid-crystal polyester resin (mfd. by Polyplastics Co., Ltd., trade name: "Vectra")
A-4: polyphenylene sulfide resin (mfd. by Kureha Chemical Industry Co., Ltd. tradename: "Fortlon KPS")
Note[2]
B-1: Ketjen black EC (particle diameter: 30 μm) (mfd. by Lion Corporation)
B-2: acetylene black (mfd. by Denki Kagaku Kogyo K.K.)
B-3: aluminum powder (particle diameter: 60 μm)
B-4: carbon fiber (mfd. by Kureha Chemical Industry Co., Ltd.)
B-5: stainless steel fiber (fiber diameter: 8 μm, fiber length: 5 mm)
Note[3]
C-1: polyurethane primer Soflex No. 1100S (mfd. by Nippon Oil & Fats Co., Ltd.)
C-2: polyurethane primer (primer essentially comprising a polyurethane resin and a spiro ortho ester)
C-3: olefin primer (Soflex No. 6000 mfd. by Kansai Paint Co., Ltd.)
C-4: epoxy primer (Plaglos No. 1100MS, mfd. by Nippon oil & Fats Co., Ltd.)
Note[4]
D-1: melamine alkyd paint (Amilac mfd. by Kansai Paint Co., Ltd.)
D-2: acrylic paint (Belcoat No. 5800, mfd. by Nippon Oil & Fats Co., Ltd.)
D-3: polyester paint (Melami No. 1500, mfd. by Nippon Oil & Fats Co., Ltd.)
D-4: acrylic urethane paint (Soflex No. 5000, mfd. by Kansai Paint Co., Ltd.)
D-5: cellulose paint (Celva No. 1400, mfd. by Kansai Paint Co., Ltd.)

We claim:

1. A process for the electrostatic coating of crystalline thermoplastic resin, which process comprises the steps of:
electrostatically applying a curable polymer which consists essentially of (i) between 50 to 98% by weight of a polyurethane resin, and (ii) between 2 and 50% by weight of a spiro orthoester or a spiro orthocarbonate to a molding of a resin composition comprising 100 parts by weight of a crystalline thermoplastic polyacetal, polyester or polyphenylene sulfide resin and 2 to 100 parts by weight of a conductive filler and having a surface resistivity of $10^9 \Omega$ or below,
curing the electrostatically applied primer,
electrostatically applying a curable top coat to the resulting molding over said cured primer, and then subsequently
curing the top coat by baking.

2. A process for the electrostatic coating of a crystalline thermoplastic resin as set forth in claim 1, wherein said conductive filler is a metallic or carbonaceous material and is in a fine particulate state having a mean particle diameter of 150 μm or below.

3. A process for the electrostatic coating of a crystalline thermoplastic resin as set forth in claim 1, wherein said conductive filler is in a flaky or fibrous state and is metallic or carbonaceous material.

4. A molding coated by a process for the electrostatic coating of a crystalline thermoplastic resin as set forth in any one of claims 1 or 2.

* * * * *

UNITED STATES PATENT AND TRADEMARK OFFICE
CERTIFICATE OF CORRECTION

PATENT NO. : 5,194,328

DATED : March 16, 1993

INVENTOR(S) : SUZUKI et al

It is certified that error appears in the above-identified patent and that said Letters Patent is hereby corrected as shown below:

Column 1, line 9, after "film" insert --having--;
line 10, after "lent" delete "in";
line 35, change "pinhole" to --pinholes-- and change "blister" to --blisters--;
line 36, change "tends" to --tend--.

Column 3, line 31, change "clude" to --cludes--.

Signed and Sealed this

Twenty-third Day of November, 1993

Attest:

BRUCE LEHMAN

*Attesting Officer*   *Commissioner of Patents and Trademarks*